Dec. 25, 1956  S. G. JOHNSON, JR  2,775,007
MOLD ASSEMBLY DEVICE
Filed April 11, 1955
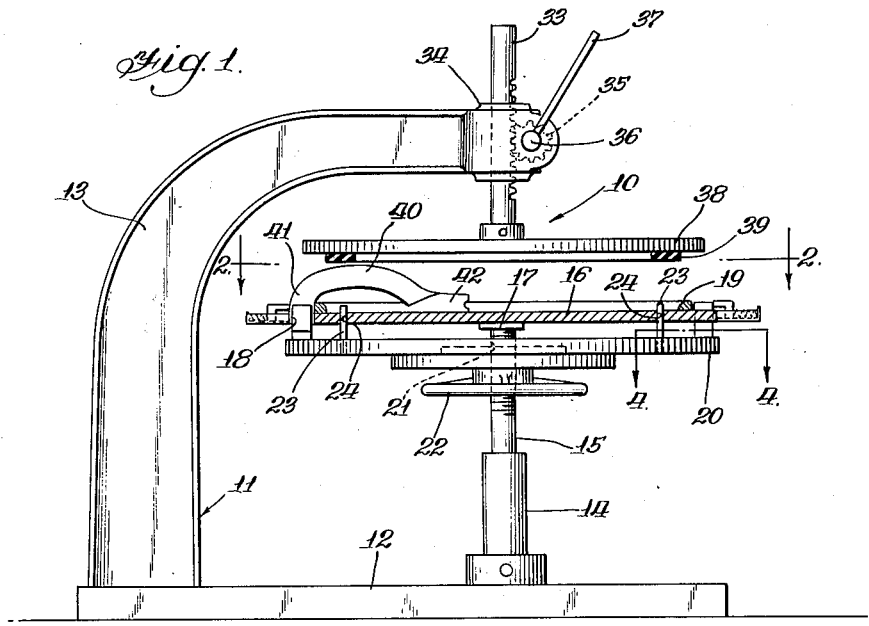
INVENTOR.
Samuel G. Johnson, Jr.
BY Paul O. Pippel
Atty.

United States Patent Office 2,775,007  
Patented Dec. 25, 1956

2,775,007

MOLD ASSEMBLY DEVICE

Samuel G. Johnson, Jr., North Riverside, Ill., assignor to International Harvester Company, a corporation of New Jersey Application April 11, 1955, Serial No. 500,573

12 Claims. (Cl. 22—37)

This invention relates to a device or fixture used in the assembly of a plurality of individual mold sections. More particularly the invention relates to a device for assembling a plurality of frangible core molds into a unitary core.

The present invention is particularly concerned with the assembly of a plurality of core sections of a type used in the foundry process for manufacturing torque converter castings. Castings of this type generally comprise a plurality of circumferentially spaced vanes and in the foundry process of making these vanes, individual core segments of a frangible plaster-like material are connected together to form a unitary core which cooperates with other portions of a mold. The plaster cores are generally made up in batches and it has been found extremely difficult to make one batch of cores identical to another. Thus dimensional differences between the batches exist so that any fixture for assembling the cores will have to be able to accommodate the dimensional differences so that the cores of each batch are accurately spaced with respect to each other in order that the final vane thickless of each vane will be identical. It is a prime object of this invention therefore to provide an improved fixture or device for properly positioning and spacing individual core sections prior to their assembly into a unitary core mold.

A still further object is to provide an improved spacing and clamping mechanism for assembling core sections into a unitary mold, the clamping and spacing means cooperating to maintain the core sections in proper relatively spaced relation so that the resultant cast product will have a high degree of accuracy. These and further objects will become more readily apparent from a reading of the specification when examined in connection with the accompanying sheet of drawing.

In the drawing:

Figure 1 is a side elevational view, partially in section, of a mold assembly fixture or device;

Figure 2 is a sectional view through a mold assembly device taken particularly along the line 2—2 of Figure 1;

Figure 3 is a detail perspective view of a wedge or core section spacing element, and Figure 4 is an enlarged fragmentary sectional view taken substantially along the line 4—4 of Figure 1.

A mold assembly fixture or device is generally designated by the reference character 10. The device 10 comprises a support 11 having a base 12. An L-shaped supporting arm 13 extends upwardly from the base 12. The base 12 supports a vertical pedestal 14 on which a vertical screw 15 is positioned. The screw 15 is rigidly connected to the pedestal 14. A platform 16 is rigidly connected to the screw 15 as indicated at 17.

The platform 16 is provided at its outer peripheral edge with a plurality of circumferentially spaced openings or slots 18. A locating ring or annular ridge 19 is positioned adjacent the slots 18. A plate 20 is disposed below the platform 16, the said plate 20 including an opening 21 which permits vertical sliding movement of the plate 20 with respect to the screw 15. A hand wheel 22 is threaded on the screw 15, the hand wheel being movable for raising and lowering the plate relative to the platform 16.

The plate 20 is provided with a pair of pins 23 which extend vertically through openings 24 in the platform 16. Thus the plate 20 may be vertically moved relative to the platform 16 but the pins 23 serve to maintain the plate 20 against rotation during upward or downward movement of said plate 20 upon turning of the hand wheel 22.

A plurality of wedge shaped spacer members 25 are supported on the plate 20 in circumferentially spaced relation. The spacer members 25 comprise oppositely disposed converging sides 26 and a base 27. As best indicated in Figure 4, the spacer members 25 are inserted into recesses or slots 28 provided in the plate 20.

The platform 16 has a plurality of spring devices or pressure applying members 29 connected thereto in circumferentially spaced relation as best shown in Figure 2. The spring devices 29 each comprise a tubular retainer 30 having a spring 31 held captive therein. Each spring 31 urges an engaging element 32 toward the axis of the platform 16.

A vertically movable rack 33 is positioned on the supporting arm 13. The rack 33 is movable in a bearing 34. A gear 35 is rotated on the shaft 36, within the bearing 34, by means of a handle 37. The gear engages the rack 33 for raising and lowering the same. A clamping plate 38 is connected to the rack 33. The clamping plate 38 has on its underneath side a rubber ring 39.

As best shown in Figures 1 and 2 a plurality of mold sections or cores 40 are positioned on the platform 16. Each of the cores is of bridge-like or arcuate shape and includes an outer base member 41 and an inner base member 42.

The principal object that this mold assembly device 10 serves is to correctly and easily space the cores of a torque converter manufacturing mold so that the blades formed by the cores are all of the same thickness. One batch of cores after they are manufactured may vary dimensionally with respect to another batch and this variance and dimension presents a problem when the cores are unequally spaced within the mold so that certain of the resultant cast vanes of the torque converter are of different thicknesses. If the cores of each batch made, however, are relatively properly spaced the vanes will be of the same thickness within each casting. In order to assemble the cores into a unitary core mold on the present assembly device 10 the following procedure takes place: The wedge-shaped spacer members 25 are inserted into the recesses 28 of the plate 20. By turning the hand wheel 22 the plate 20 is moved upwardly so that the diverging sides 26 project slightly above the platform 16. The cores are then positioned in circumferentially spaced relation as shown in Figure 2. Figure 2 shows only two cores thus positioned but it is understood that enough cores are provided to completely cover the platform 16. The cores are so positioned that each engaging element 32 urges the outer base member against the locating ring or ridge 19. Thus the spring devices 29 serve to securely maintain the core elements in proper position with respect to the locating ring. The next step is to lower the plate 38 by means of the handle 37. The rubber ring 39 engages the upper portions of the core sections 40 to hold them against vertical movement. The operator again rotates the hand wheel 22 so that the wedges will be moved upwardly between each of the outer base members 41 of adjacent core sections 40. The wedges move upwardly through the openings 18 of the platform 16 and upward movement of the plate 20 is continued until the cores are all positioned in tightly but spaced relation. This movement of the core sections 40 is in a lateral or circumferential direction by virtue of the diverging or converging sides 26 of each wedge-shaped member 25.

It can be seen that in this position the cores are tightly held against movement and are properly spaced in equal relation so that they now can be connected together to form a unitary core mold. Generally a plaster connecting piece is poured into a space formed by the circumferentially spaced and adjacent inner base members 42. Thus the individual core sections are now suitably connected together into one unitary mold structure and since the connection of the individual sections has taken place while the sections have been firmly held against movement accurate spacing between the core sections is accomplished. This results in a uniform thickness in the resultant cast part. Dimensional differences, thus, between individual batches of cores will not result in undesirable castings. To remove the connected cores from the fixture various grab or moving devices may be utilized which are so designed to carefully move the mold structure without changing the spring of the cores. It is apparent that the device is simple to operate and that the speedy and accurate assembly of mold cores can be accomplished. Thus, the objects of the invention have been fully achieved and it must be understood that changes and modifications may be made without departing from the spirit of the invention as disclosed or from the scope of the appended claims.

What is claimed is:

1. A mold assembly device adapted to relatively position a plurality of mold sections, comprising a support, a screw member vertically positioned on said support, a platform rigidly connected to said screw member, a locating ring mounted on said platform, said platform having a circumferentially extending portion disposed outwardly of said locating ring, said portion including a plurality of circumferentially disposed openings, a plurality of circumferentially disposed pressure applying members mounted on said platform outwardly of said ring, said pressure applying members each including resilient means, engaging means normally urged inwardly by said resilient means toward said ring, a positioning plate carried by said screw member below said platform, an adjusting member rotatably mounted on said screw member for adjusting said plate member vertically relative to said platform, means connected to said plate to maintain said plate against rotation relative to said platform, a plurality of centering members carried on said plate in circumferentially spaced relation and in registry with said openings in the platform, each centering member including a vertically extending wedge-shaped element, each element having oppositely disposed converging walls adapted to engage adjacent mold sections for equally spacing said sections with respect to each other during upward movement of said plate whereby said elements project above said platform, said engaging means urging mold sections on said platform against said ring, and resilient clamping means above said platform adapted to be moved down into engagement with mold sections to retain the same on said platform against vertical movement.

2. A mold assembly device adapted to relatively position a plurality of mold sections comprising a support, a vertical member positioned on said support, a platform rigidly connected to said vertical member, a locating ring mounted on said platform, said platform having a plurality of circumferentially disposed openings, a plurality of circumferentially disposed pressure applying members mounted on said platform outwardly of said ring, said pressure applying members each including resilient means and engaging means normally urged inwardly by said resilient means toward said ring, a positioning plate carried by said vertical member below said platform, an adjusting member movably mounted on said vertical member for adjusting said plate member vertically relative to said platform, means connected to said plate to maintain said plate against rotation relative to said platform, a plurality of centering members carried on said plate in circumferentially spaced relation, and in registry with said openings in the platform, each centering member including a vertically extending wedge shaped element, each element having oppositely disposed converging walls adapted to engage adjacent mold sections for equally spacing said sections with respect to each other during upward movement of said plate whereby said elements project above said platform, said engaging means urging mold sections on said platform against said ring, and resilient clamping means above said platform adapted to be moved down into engagement with said mold sections to retain the same on said platform against vertical movement.

3. A mold assembly device adapted to relatively position a plurality of mold sections, comprising a support, a vertical member positioned on said support, a platform rigidly connected to said vertical member, a locating ring mounted on said platform, said platform having a plurality of openings disposed about said locating ring, a plurality of circumferentially disposed pressure applying members mounted on said platform outwardly of said ring, said pressure applying members each including resilient means and engaging means normally urged inwardly by said resilient means toward said ring, a positioning plate carried by said vertical member below said platform, an adjusting member movably mounted on said vertical member for adjusting said plate member vertically relative to said platform, means connected to said plate to maintain said plate against rotation relative to said platform, a plurality of centering members carried on said plate in circumferentially spaced relation and in registry with said openings in the platform, each centering member including a vertically extending wedge-shaped element, each element having oppositely disposed converging walls adapted to engage adjacent mold sections for equally spacing said sections with respect to each other during upward movement of said plate whereby said elements project above said platform, said engaging means movably urging mold sections on said platform against said ring, and resilient clamping means above said platform adapted to be moved down into engagement with said mold sections to retain the same on said platform against vertical movement.

4. A mold assembly device adapted to relatively position a plurality of mold sections comprising a support, a platform connected to said support, a locating ring supported on said platform, said platform having a plurality of circumferentially spaced openings located adjacent said locating ring, a positioning plate disposed beneath said platform, and means adapted to move said plate vertically relative to said platform, a plurality of centering members associated with said plate, said centering members comprising a plurality of wedge-shaped elements, said elements being movable with said plate, said elements including portions which project through said openings of said platform whereby said projecting portions engage adjacent mold sections for relatively spacing said sections circumferentially on said platform.

5. A mold assembly device adapted to relatively position a plurality of mold sections comprising a support, a platform connected to said support, a locating ring supported on said platform, said platform having a plurality of circumferentially spaced openings located adjacent said locating ring, a positioning plate disposed beneath said platform, means adapted to move said plate vertically relative to said platform, a plurality of centering members on said plate, said centering members comprising a plurality of wedge-shaped elements, said elements being movable with said plate, said elements including portions which project through said openings of said platform whereby said projecting portions engage adjacent mold sections for relatively spacing said sections circumferentially on said platform, and resilient elements circumferentially disposed on said platform for clamping mold sections on said platform against said locating ring.

6. A mold assembly device adapted to relatively position a plurality of mold sections comprising a support, a platform connected to said support, a locating ring supported on said platform, said platform having a plurality of circumferentially spaced openings located adjacent said locating ring, a positioning plate disposed beneath said platform, means adapted to move said plate vertically relative to said platform, and a plurality of centering members associated with said plate, said centering members comprising a plurality of circumferentially disposed elements including portions which project through said openings of said platform, whereby said projecting portions engage adjacent mold sections for relatively spacing said sections circumferentially on said platform, and resilient elements circumferentially disposed on said platform for clamping mold sections on said platform against said locating ring.

7. A mold assembly device for positioning mold sections comprising; a support, a platform on said support, locating means on said platform, said platform including a plurality of circumferentially disposed openings, a plate movably disposed beneath said platform, means adapted to vertically move said plate relative to said platform, and a plurality of circumferentially spaced wedges positioned on said plate, said wedges being movable with said plate to project through said openings for engaging and circumferentially spacing mold sections on said platform.

8. A mold assembly device for positioning mold sections comprising; a support, a platform on said support, locating means on said platform, said platform including a plurality of circumferentially disposed openings, a plate movably disposed beneath said platform, means adapted to vertically move said plate relative to said platform, a plurality of circumferentially spaced wedges positioned on said plate, said wedges being movable with said plate to project through said openings for engaging and circumferentially spacing mold sections on said platform.

9. A mold assembly device for positioning mold sections comprising; a support, a platform on said support, said platform including a plurality of circumferentially disposed openings, a plate movably disposed beneath said platform, means adapted to vertically move said plate relative to said platform, and a plurality of circumferentially spaced wedges positioned on said plate, said wedges being movable with said plate to project through said openings for engaging and circumferentially spacing mold sections on said platform.

10. A mold assembly device for positioning mold sections comprising; a support, a platform on said support, locating means on said platform, a plate movably disposed beneath said platform, means adapted to vertically move said plate relative to said platform, and a plurality of circumferentially spaced spacer members positioned on said plate, said spacer members being movable with said plate to a position above said platform for engaging and circumferentially spacing mold sections on said platform.

11. A mold assembly device for positioning mold sections comprising; a support, a platform on said support, locating means on said platform, a plate movably disposed beneath said platform, means adapted to vertically move said plate relative to said platform, and a plurality of circumferentially spaced spacer members positioned on said plate, said spacer members being movable with said plate to a position relative to said platform for engaging and circumferentially spacing mold sections on said platform, and resilient clamping means for clamping said mold sections on said platform.

12. A mold assembly device for positioning mold sections comprising; a support, a platform on said support, locating means on said platform, a plate movably disposed beneath said platform, means adapted to vertically move said plate relative to said platform, and a plurality of circumferentially spaced spacer members positioned on said plate, said spacer members being movable with said plate to a position above said platform for engaging and circumferentially spacing mold sections on said platform, and clamping means connected to said support, said clamping means being movable downwardly over mold sections on said platform for securing the same thereon.

No references cited.